(No Model.)

P. D. DERICKX.
HARNESS ATTACHMENT.

No. 369,322. Patented Sept. 6, 1887.

WITNESSES:
C. A. Preston
F. S. Lingenau

INVENTOR:
Paul D. Derickx

UNITED STATES PATENT OFFICE.

PAUL D. DERICKX, OF DETROIT, MICHIGAN.

HARNESS ATTACHMENT.

SPECIFICATION forming part of Letters Patent No. 369,322, dated September 6, 1887.

Application filed November 12, 1886. Serial No. 218,722. (No model.)

*To all whom it may concern:*

Be it known that I, PAUL D. DERICKX, a citizen of the United States, residing at Detroit, in the county of Wayne and State of Michigan, have invented a new and useful Improvement in Harnesses, of which the following is a specification.

Figure 4:
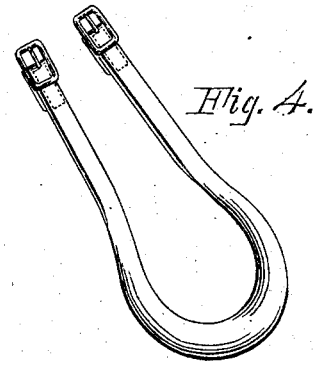

Heretofore the cruppers in harnesses have been made loop-shaped, as shown in the drawings in Figure 4, to fasten under and partly around the animal's tail, to prevent the animal's head-check from drawing the saddle out of its proper place. When, therefore, the animal lifts his head or tail, it causes the crupper to slacken, and a contrary movement of the head causes the crupper to rub on the animal's tail. The tail by swinging will also rub on the crupper, thus causing soreness on the animal's tail; and the object of my invention is to provide harnesses with a crupper that will not make the animal's tail sore. I attain this object by the system illustrated in the accompanying drawings, in which—

Figure 1:
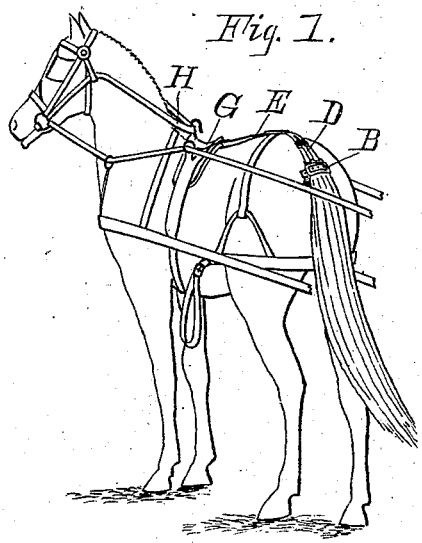
Figure 2:
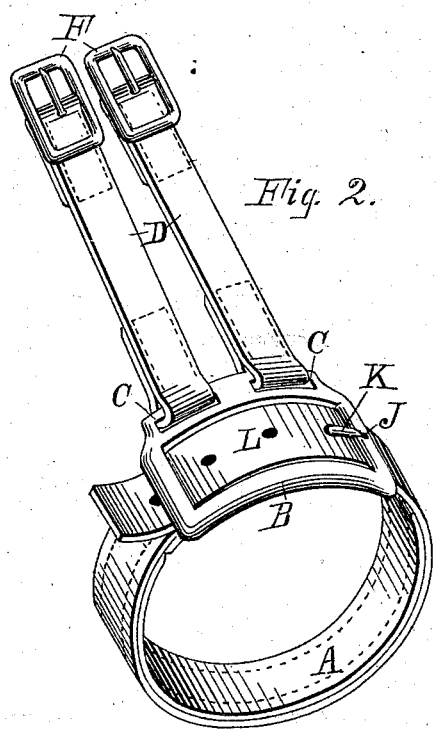
Figure 3:
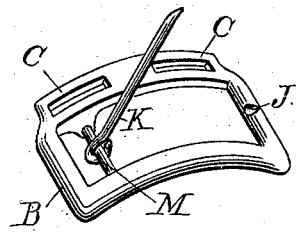

Fig. 1 is a detailed view of the crupper in combination with the harness as it appears when in use on the animal; Fig. 2, a sectional view of the crupper with its buckles and extensions; Fig. 3, a detailed view of the buckle, and Fig. 4 a view of common form of crupper.

Similar letters refer to similar parts throughout the several views.

In the drawings, A is the crupper, having apertures L for its adjustment; B, its fastening-buckle, having a pin, K, and notch J to hold said pin, and having a bar, M, for the connection of the said crupper and pin, and having also bars C C, as shown in Fig. 3, to hold the extension-straps D, which are connected by means of a buckle or buckles, F, to the strap E, which is connected to the saddle G to hold the check-strap H. (See Figs. 1 and 2.)

The crupper A, by means of its apertures L and the buckle B, is or can be adjusted and fastened to the animal's tail, as shown in Fig. 1, so that by the lifting or swinging of the animal's head or tail the crupper cannot slacken, thus preventing friction and soreness on the animal's tail.

Having fully described my invention, what I claim, and desire to secure by Letters Patent, is—

1. A crupper consisting of the strap to encircle the root of the tail, and provided with the buckle, and means, substantially as described, to connect the buckle with the harness.

2. In a harness, the crupper-buckle B, having the slots on the side bar for the connecting-straps, and the notch J, all substantially as set forth.

3. The crupper A, provided with the slotted buckle B, in combination with the straps D D and the back-strap E, all substantially as described.

PAUL D. DERICKX.

Witnesses:
JOHN A. BURGER,
FRANK X. LINGEMANN.